(12) United States Patent
Rowse et al.

(10) Patent No.: US 6,330,785 B1
(45) Date of Patent: *Dec. 18, 2001

(54) WHEEL RAKE SPRING ASSEMBLY

(76) Inventors: Dan D. Rowse, 2315 N., Ord, NE (US) 68862; Ron A. Rowse, HC80 Box 43, Burwell, NE (US) 68823

( * ) Notice: Subject to any disclaimer, the term of this patent is extended or adjusted under 35 U.S.C. 154(b) by 0 days.

This patent is subject to a terminal disclaimer.

(21) Appl. No.: 09/707,122

(22) Filed: Nov. 6, 2000

Related U.S. Application Data

(63) Continuation of application No. 09/285,543, filed on Apr. 2, 1999, now Pat. No. 6,220,008.

(51) Int. Cl.$^7$ ............................. A01D 78/08; A01D 80/00
(52) U.S. Cl. ............................... 56/377; 56/375; 56/367; 56/DIG. 21
(58) Field of Search .............................. 56/370, 377, 386, 56/367, 397, 378, 375, 376; 172/705, 707, 709, 763

(56) References Cited

U.S. PATENT DOCUMENTS

| | | |
|---|---|---|
| 3,204,977 | 9/1965 | Eisenhauer et al. . |
| 3,228,179 * | 1/1966 | Van Der Lely ........................ 56/377 |
| 3,246,703 | 4/1966 | Erdman . |
| 3,321,895 | 5/1967 | Morkoski . |
| 3,683,601 * | 8/1972 | Van Der Lely ............................ 56/6 |
| 3,797,817 | 3/1974 | Deisenroth . |
| 3,801,086 | 4/1974 | Raidel . |
| 3,976,144 * | 8/1976 | Ralston et al. ........................ 172/267 |
| 4,042,039 * | 8/1977 | Van Der Lely ...................... 172/49.5 |
| 4,108,267 | 8/1978 | Valerio . |
| 4,231,218 | 11/1980 | Delgado . |
| 4,324,093 | 4/1982 | Ven Der Lely et al. . |
| 4,368,783 * | 1/1983 | Hake et al. ........................... 172/705 |
| 4,427,213 | 1/1984 | Raidel, Jr. . |
| 4,736,487 | 4/1988 | Epple et al. . |
| 5,263,306 | 11/1993 | Tonutti . |

* cited by examiner

Primary Examiner—Thomas B. Will
Assistant Examiner—Meredith C. Petravick
(74) Attorney, Agent, or Firm—Zarley, McKee, Thomte, Voorhees & Sease

(57) ABSTRACT

A lifting force is applied to a wheel rake arm through a spring assembly wherein a coil spring is placed in compression rather than tension. In the preferred embodiment a rod is connected at one end to a rake wheel arm and the free end of the rod extends through a sleeve and then a coil spring which engages a stop at the opposite end of the rod. The sleeve is connected by linkages to an actuating rod.

2 Claims, 5 Drawing Sheets

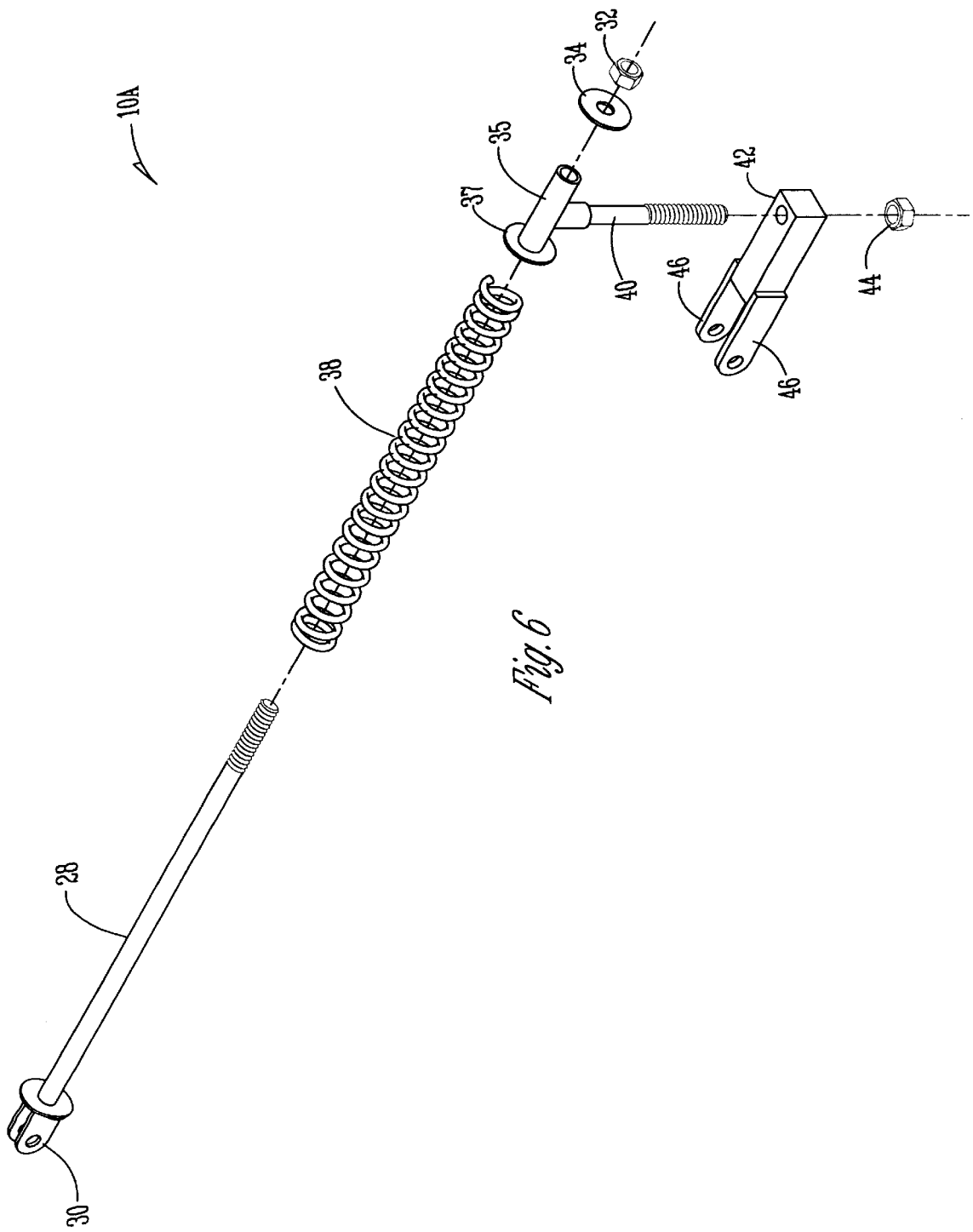

WHEEL RAKE SPRING ASSEMBLY

This is a continuing application of Ser. No. 09/285,543 filed Apr. 2,1999, now U.S. Pat. No. 6,220,008.

BACKGROUND OF THE INVENTION

Wheel rakes such as shown in co-pending application Ser. No. 08/812,234 include a series of rake arms pivotally mounted to a main frame member. FIG. 1 (prior art) herein shows this rake to include a coil spring extending between upstanding posts on the actuation rod and the rake arms such that when the rake arms are lifted off the ground the coil spring is placed in tension. A chain extends through the coil spring to limit the pivoting of the rake arm and to protect the spring such as when the rake wheel encounters a depression in the field.

This spring arrangement works satisfactorily except that it is vulnerable to breakage and the spring taking a set upon being stretched beyond an acceptable limit.

What is needed is a spring type connection between the actuation rod and the lift arms that will not be subject to spring breakage or malfunction.

SUMMARY OF THE INVENTION

The spring assembly of this invention allows for the conventional spring assembly to be replaced without other modification to the rake and thereby provide a substantially improved lifting mechanism for the rake wheels.

The lifting of the rake wheels occurs through a coil spring being place in compression rather than tension. In the preferred embodiment, a rod extends from an upstanding element on the rake arm and is received in a sleeve which is connected through linkages to the actuating rod. A coil spring is placed between the sleeve and the free end of the spring rod whereupon operation of the actuating rod causes a compressive force to be applied to the coil spring in turn applying tension to the spring rod which lifts the rake wheel. It is thus seen that the coil spring is protected from breakage and still performs its cushioned lifting function.

Another feature of this invention is that protection against damage caused by the rake wheel being unintendedly raised is provided. The linkage between the actuating rod and the sleeve allows for tension forces only being applied to it such as in a chain, thus, should the rake wheel be inadvertently raised through the wheel hitting a bump, the linkage will simply pivot allowing the rake wheel to freely pivot upwardly thereby avoiding damage to the spring assembly and actuating rod.

While the preferred embodiment of this invention has the spring assembly on top of the main frame, it would be possible to mount it on the bottomside and thereby place the coil spring between the sleeve and the spring rod end connected to the rake arm. It is seen that in either arrangement the lifting forces are transmitted through the coil spring by placing the coil spring in compression rather than tension.

DESCRIPTION OF THE DRAWINGS

FIG. 6 is an exploded perspective view similar to FIG. 3 but showing the coil spring mounted on the opposite side of the sleeve, between the sleeve and the wheel rake arm.

DESCRIPTION OF THE PREFERRED EMBODIMENT

Figure 1:
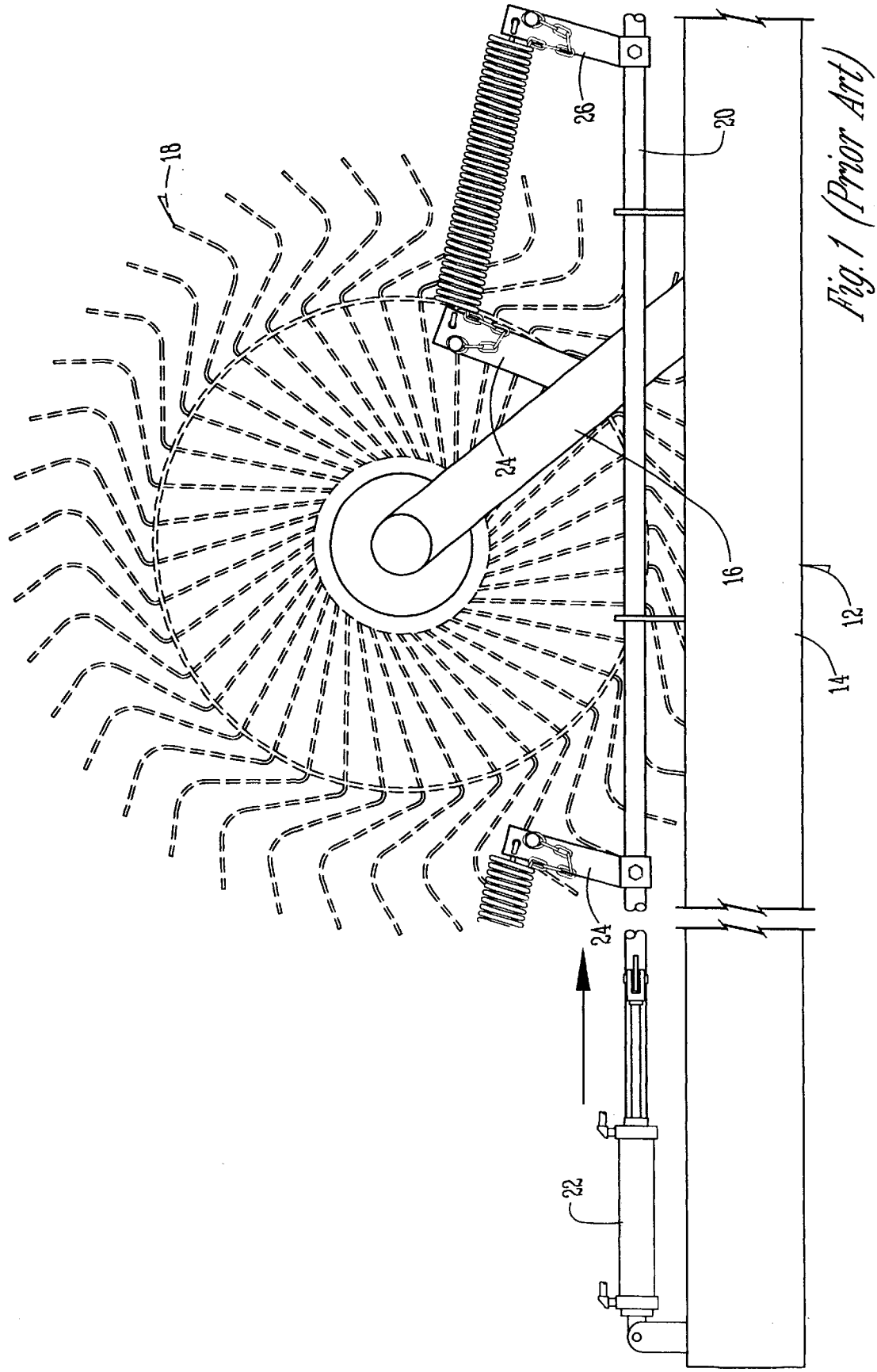
FIG. 1 is a fragmentary side elevation view of a conventional wheel rake as shown in Ser. No. 08/812,234.
Figure 2:
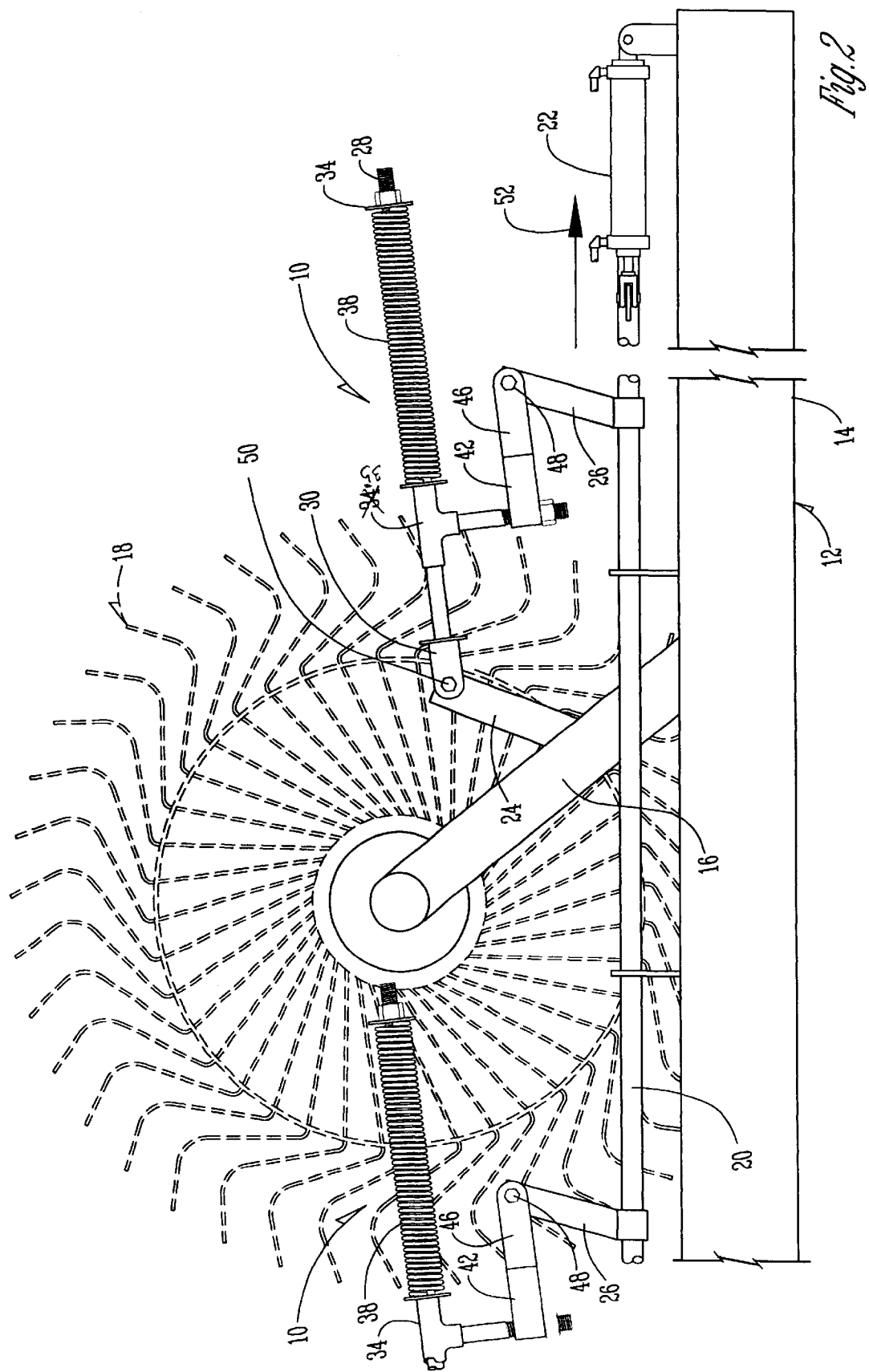
FIG. 2 is a view similar to FIG. 1 but showing the spring assembly of this invention being substituted for the conventional tension spring assembly.

The spring assembly of this invention is referred to generally in FIG. 2 by the reference numeral 10 and is shown on a rake 12 having a main frame 14 to which a series of wheel rake arms 16 are pivotally connected. Rake wheels 18 are provided on the outer ends of the wheel rake arms 16. The rake arms 16 are raised by operation of an actuating rod 20 powered by a hydraulic cylinder 22. An upstanding element 24 is provided on the rake arm 16 in longitudinally spaced relation to an upstanding element 26 on the actuating rod 20. The spring assembly 10 is connected between the two upstanding elements 24 and 26.

Figure 3:
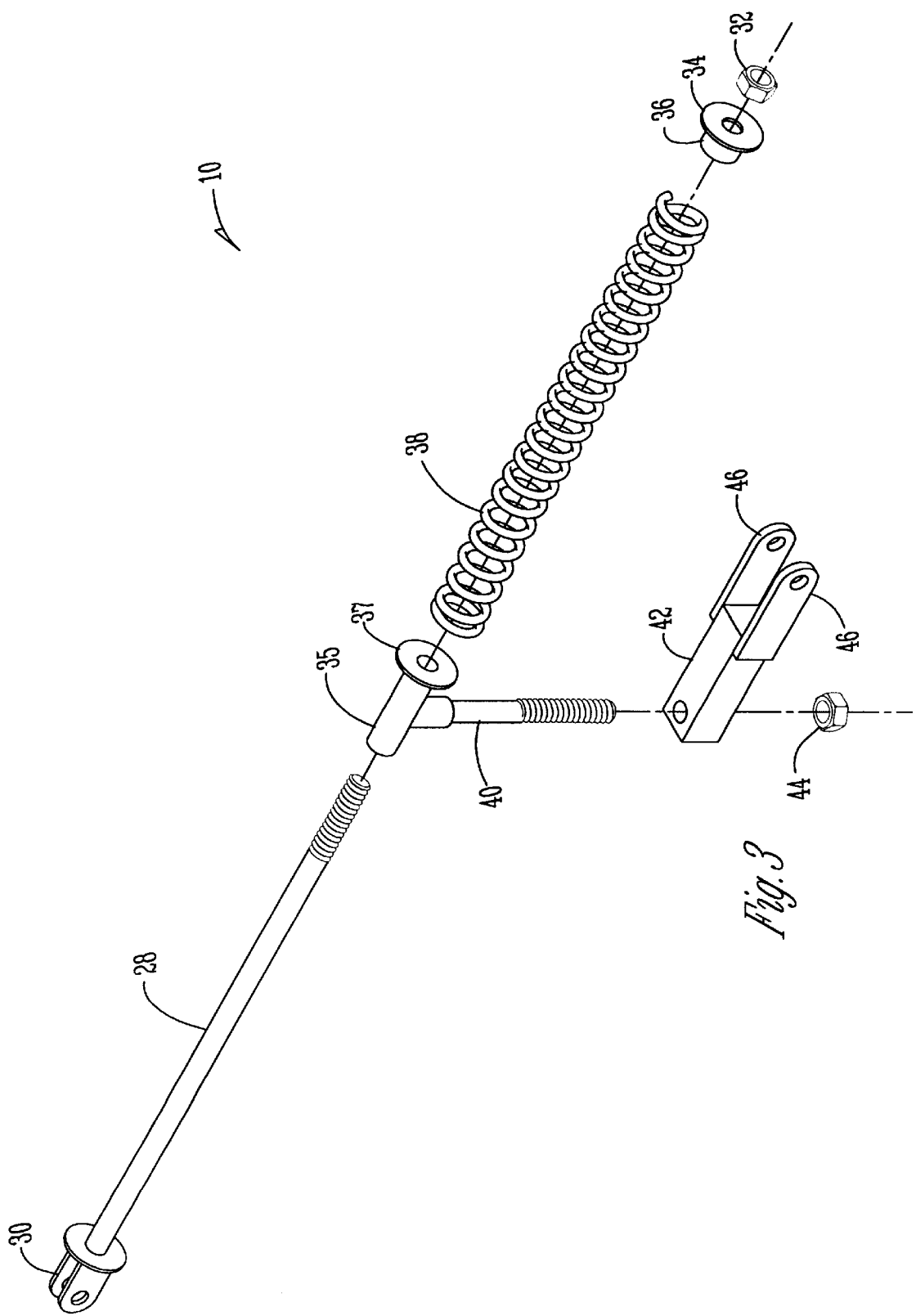
FIG. 3 is an exploded perspective view of the spring assembly.

The spring assembly 10 as seen in FIG. 3 includes a spring rod 28 having a clevis end connector 30 at one end and a stop nut 32 at the opposite end which engages a washer 34 on a bushing 36 extending into a coil spring 38. Coil spring 38 is positioned between the stop nut 32 and a sleeve 35 mounted on the spring rod 28. The sleeve 35 includes a washer 37 against which the adjacent coil spring end bears.

A downwardly extending element 40, threaded on its lower end, extends from the sleeve 35 and receives an elongated clevis connector 42 which is allowed to freely pivoted thereon. A nut 44 maintains the clevis connector on the element 40. The clevis connector 42 is elongated and includes plate elements 46 for connection by a bolt 48 to the element 26 on the actuating 20 as seen in FIG. 2. Clevis 30 is connected by a bolt 50 to the upstanding element 24 on the rake arm 16.

It is thus seen in operation that the actuating rod 20, when moved to the right as indicated by the arrow 52 in FIG. 2, the spring assembly 10 will transmit the lifting force through the coil spring 38 to the rake arm 16 by placing the spring in compression.

Figure 4:
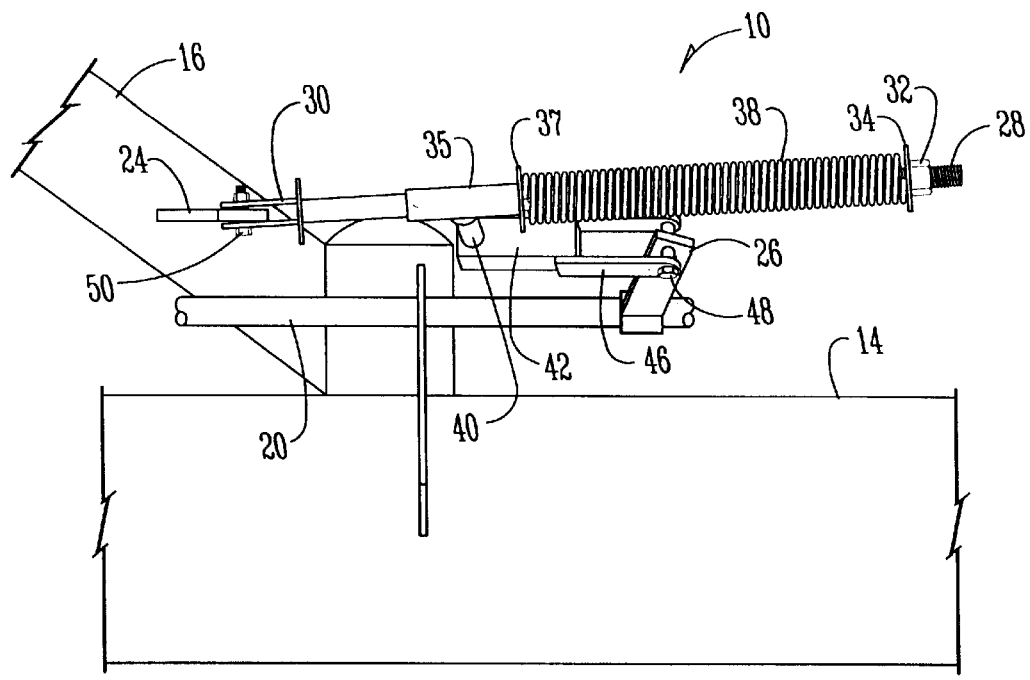
FIGS. 4 and 5 are fragmentary top views of the spring assembly illustrating the pivoting movement that occurs in the linkage connecting the spring assembly to the actuating rod resulting from the rake arm being raised independently of operation of the actuation rod.
Figure 5:
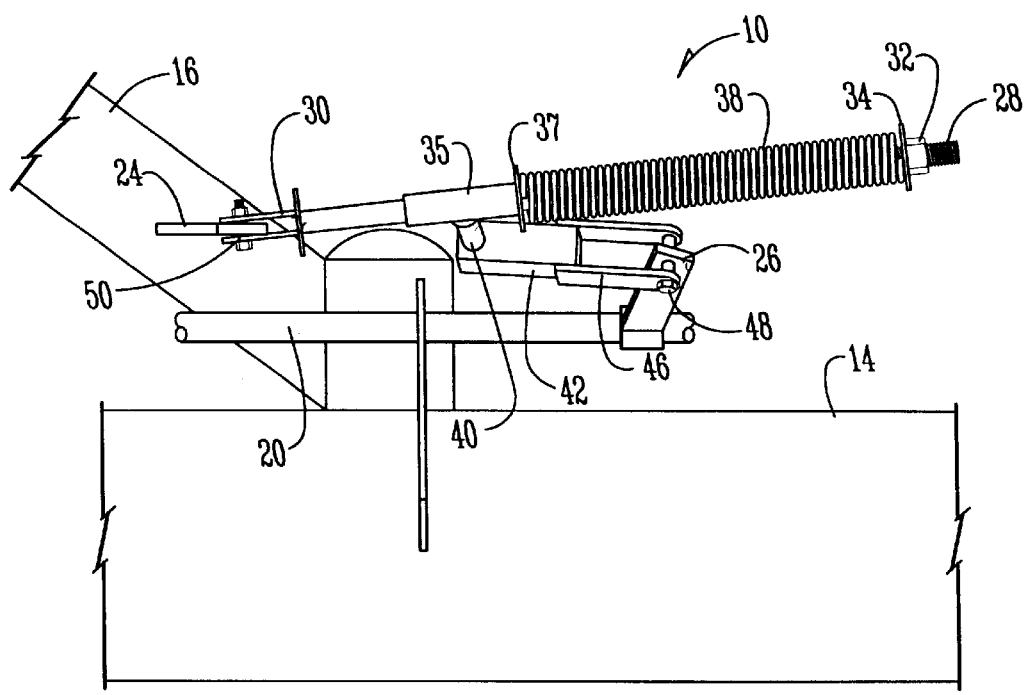

As seen in FIGS. 4 and 5, should the rake arm rise independently of operation of the actuation rod 20, damage will be prevented by the clevis connector linkage element 42 pivoting on the element 40.

An alternate embodiment of the spring assembly 10 is shown in FIG. 6 and is referred to by the reference numeral 10A. The spring assembly might be positioned in a different location such as below the main frame 14 (not shown). The coil spring 38 still functions in compression. Two changes are made with the first being positioning the coil spring 38 between the rod end 30 and the sleeve 35 and turning the clevis connector link element 42 180 degrees so that when lifting of the rake arm 16 occurs, the clevis link 42 will be in tension and thus will not pivot as it would if it were in compression. Nevertheless, should the lift arm 16 be raised independently of operation of the actuation rod 20, damage will be prevented by the clevis link 42 pivoting on the element 40.

It is understood that the spring assemblies 10 and 10A have other uses where transmitting a force through a spring assembly is desired.

What is claimed is:

1. A farm equipment implement having a main frame to which an arm is moveably connected, an actuating rod is moveable on said main frame for moving said arm through a spring assembly, said spring assembly comprising, a rod connected at one end to said arm and having a stop at its opposite end, a sleeve on said rod, a coil spring on said rod between said sleeve and said stop, linkage connecting said sleeve to said actuating rod whereby movement of said actuating rod for moving said arm places said coil spring in compression, and said linkage being pivotally connected between said sleeve and said actuating rod such that said linkage will transmit a tension force, but not a compressive force whereby unintended moving of said arm will not transmit a compressive force to said actuating rod.

2. A farm implement having a main frame to which an arm is pivotably connected, an actuating rod is moveable on said main frame for pivoting said arm through a spring assembly, said spring assembly comprising, a rod connected at one end to said arm and having a stop at its opposite end, a sleeve on said rod, a coil spring on said rod between said sleeve and said stop, linkage connecting said sleeve to said actuating rod whereby movement of said actuating rod for lifting said arm places said coil spring in compression, and said linkage being pivotally connected between said sleeve and said actuating rod such that said linkage will transmit a tension force, but not a compressive force whereby unintended lifting of said arm will not transmit a compressive force to said actuating rod.

* * * * *